United States Patent [19]

Enjeti et al.

[11] Patent Number: 5,903,066
[45] Date of Patent: May 11, 1999

[54] ACTIVE INTERPHASE REACTOR FOR 12-PULSE RECTIFIER

[75] Inventors: Prasad N. Enjeti, College Station, Tex.; Ira J. Pitel, Morristown, N.J.

[73] Assignee: Texas A & M University System, Houston, Tex.

[21] Appl. No.: 08/958,295

[22] Filed: Oct. 27, 1997

Related U.S. Application Data

[60] Provisional application No. 60/029,663, Oct. 29, 1996.

[51] Int. Cl.$^6$ ....................................................... H02J 1/02
[52] U.S. Cl. .............................. 307/105; 363/39; 363/44; 323/207; 333/167
[58] Field of Search .............................. 307/105; 363/39, 363/40, 41, 44, 84, 87, 88, 89, 95, 96, 98, 129, 132, 137; 323/210, 207; 333/167

[56] References Cited

U.S. PATENT DOCUMENTS

| | | | |
|---|---|---|---|
| 4,143,414 | 3/1979 | Brewster et al. | 363/44 |
| 4,739,466 | 4/1988 | Glennon et al. | 363/89 |
| 5,283,726 | 2/1994 | Wilkerson | 363/41 |
| 5,343,079 | 8/1994 | Mohan et al. | 307/105 |
| 5,345,375 | 9/1994 | Mohan | 363/40 |
| 5,351,180 | 9/1994 | Brennen et al. | 307/105 |
| 5,465,203 | 11/1995 | Bhattacharya et al. | 307/105 |
| 5,499,178 | 3/1996 | Monhan | 307/105 |
| 5,656,924 | 8/1997 | Mohan et al. | 307/105 |
| 5,691,577 | 11/1997 | Smith | 307/105 |

FOREIGN PATENT DOCUMENTS

| | | |
|---|---|---|
| 3545770 A1 | 6/1987 | Germany . |
| 648 965 A5 | 4/1985 | Switzerland . |

OTHER PUBLICATIONS

Choi, Sewan et al., "A New Active Interphase Reactor for 12–Pulse Rectifiers Provides Clean Power Utility Interface", *IEEE*, pp. 2468–2474, 1995.

Choi, Sewan et al., "Polyphase Transformer Arrangements With Reduced kVA Capacities For Harmonic Current Reduction in Rectifier Type Utlility Interface", *IEEE*, pp. 353–359.

*Primary Examiner*—Jeffrey Gaffin
*Assistant Examiner*—Jonathon S Kaplan
*Attorney, Agent, or Firm*—Arnold, White & Durkee

[57] ABSTRACT

An active interphase reactor for twelve-pulse diode rectifiers is disclosed. The system draws near sinusoidal currents from a power utility. In one embodiment, a low kVA (0.02 $P_o$(PU)) active current source injects a triangular current into an interphase reactor of a twelve-pulse diode rectifier. This modification results in near sinusoidal utility input currents with less than 1% THD. In alternative embodiments, a low kVA, 12-pulse system with an autotransformer arrangement (kVA rating of 0.18 $P_o$(PU)) is implemented with the proposed active interface reactor. The resulting systems draw clean power from the utility and are suitable for powering larger kVA ac motor drive systems.

6 Claims, 15 Drawing Sheets

ACTIVE INTERPHASE REACTOR FOR 12-PULSE RECTIFIER

RELATED APPLICATION

This application claims the priority of provisional U.S. patent application Ser. No. 60/029,663, filed Oct. 29, 1996.

FIELD OF THE INVENTION

This invention relates generally to the field of electric power systems, and more particularly to an interface to an electric utility.

BACKGROUND OF THE INVENTION

Large harmonics, poor power factor, and high total harmonic distortion (THD) in a utility (power supply) interface are common problems when nonlinear loads such as adjustable speed drives, power supplies, induction heating systems, UPS systems and aircraft converter systems are connected to the electric utility.

In some systems, the interface to the electric utility includes a three phase uncontrolled diode bridge rectifier. Due to the nonlinear nature of some loads, the input line currents can have significant harmonics. For adjustable speed AC motor drive systems with no DC-link smoothing inductor, the discontinuous conduction of the diode bridge rectifier can result in high current THDs which can lead to the malfunction of other sensitive electronic equipment.

One recommended practice to address these issues, IEEE 519, has evolved to maintain utility power quality at acceptable levels. See, "IEEE Recommended Practices and Requirements for Harmonic Control in Electric Power Systems", *IEEE PES and Static Converter Committee of IAS*, January 1993.

A number of methods have been proposed to overcome the presented problems. See, e.g., J. Schaefer, "Rectifier Circuits: Theory and Design," John Wiley & Sons, Inc., 1965; B. R. Pelly, "Thyristor Phase-Controlled Converters and Cycloconverters, John Wiley & Sons, 1971; R. W. Lye, etc. al, "Power Converter Handbook," Power Delivery Department, Canadian General Electric Company Ltd., 1976; G. Seguier, "Power Electronic Converters AC/DC Conversions," McGraw-Hill, New York, N.Y., 1986; G. Oliver, etc. al, "Novel Transformer Connection to Improve Current Sharing on High Current DC Rectifiers," *IEEE IAS Conf.*, 1993, pp. 986–992; S. Miyairi, etc. al, "New Method for Reducing Harmonics Involved in Input and Output of Rectifier with Interphase Transformer," *IEEE Trans. on Industry Applications*, Vol. IA-22, No. 5, September/October 1986, pp. 790–797; A. R. Prasad, P. D. Ziogas, S. Manias, "An Active Power Factor Correction Technique for Three-Phase Diode Rectifiers," *IEEE Trans. on Power Electronics*, Vol. 6, No. 1, January 1991, pp. 83–92; Ned Mohan, "A Novel Approach to Minimize Line-Current Harmonics in Interfacing Renewable Energy Sources with 3-Phase Utility Systems," *IEEE APEC Annual Meeting*, 1992, pp. 852–858; S. Kim, P. Enjeti, P. Packebush and I. Pitel, "A New Approach to Improve Power Factor and Reduce Harmonics in a Three-Phase Diode Rectifier Type Utility Interface," *IEEE Trans. on Industry Applications*, Vol. 30, No. 6, November/December 1994, pp. 1557–1564; I. Pitel and S. N. Talukdar, "A Review of the Effects and Suppression of Power Converter Harmonics," *IEEE IAS Conference*, May 1977; S. Choi, P. Enjeti, I. Pitel, "New Polyphase Transformer Arrangements with Reduced kVA Capacities for Harmonic Current Reduction in Rectifier Type Utility Interface," *IEEE PESC Conf*, 1995, pp. 353–359; D. A. Paice, "Power Electronic Converter Harmonics: Multipulse Methods for Clean Power," New York: IEEE Press, 1996.

One approach is to use a conventional twelve-pulse diode rectifier which requires two six-pulse diode rectifiers connected via Y-Δ and Y—Y isolation transformers. An interphase reactor is required to ensure the independent operation of the two parallel-connected three-phase diode bridge rectifiers. The operation of the conventional twelve-pulse diode rectifier results in the cancellation of the 5th and 7th harmonics in the input utility line currents.

To increase the pulse number further to 18 or 24, additional diode bridge rectifiers along with complicated multiphase transformer arrangements become necessary, undesirably adding to the cost and complexity of the overall system.

SUMMARY OF THE INVENTION

The present invention relates to a three-phase diode rectifier system which draws substantially sinusoidal input currents from the three phase electric utility. In one embodiment, a Δ-Y isolation transformer of 0.52 $P_o$(PU) capacity is employed. The interphase reactor and the line impedances $L_{s1}$ and $L_{s2}$ are designed such that stable twelve-pulse operation is obtained with equal current sharing. A low kVA (0.02 $P_o$(PU)) PWM-controlled active current source injects a compensation current $I_x$ into the secondary winding of the interphase reactor. The shape of $I_x$ can be computed to alter the utility line current $I_a$ to a perfect sine wave. An approximation to the exact waveshape of $I_x$ is a triangular wave. Therefore, by injecting a triangular shaped current $I_x$ into the secondary winding of the interphase reactor, near sinusoidal input line currents flow in the utility line with less than 1% THD.

In another embodiment, an autotransformer is employed to obtain 30 degree phase shift between the two diode rectifiers. Two interphase reactors now become necessary due to the absence of electrical isolation. The kVA rating of the proposed autotransformer is 0.18 $P_o$(PU). With the active interface reactor installed, the resulting input current with this approach is also substantially sinusoidal, providing a clean power utility interface.

The various embodiments of the invention result in high performance with reduced kVA components and offer clean power utility interface suitable for powering larger kVA ac motor drives and power electronic systems.

In accordance with one aspect of the invention, a low kVA (0.02 pu) triangular current injected into the secondary winding of the interface reactor results in less than 1% THD in utility line currents, satisfying clean power requirements.

In accordance with another aspect of the invention, the active current source can be configured with low cost, high current, and low voltage single phase half/full bridge MOSFET devices. Also, the active current source electronics (MOSFET's) located at the secondary of the interface reactor are not subjected to utility line disturbances, hence rendering the interface system rugged.

In the event the active current source malfunctions, the elimination of 5th and 7th harmonics is still guaranteed due to 12-pulse operation.

BRIEF DESCRIPTION OF THE DRAWINGS

The foregoing and other features and aspects of the present invention will perhaps be best understood with reference to a detailed description of a specific embodiment of the invention, when read in conjunction with the accompanying drawings, wherein.

DETAILED DESCRIPTION OF SPECIFIC EMBODIMENTS OF THE INVENTION

Figure 1:
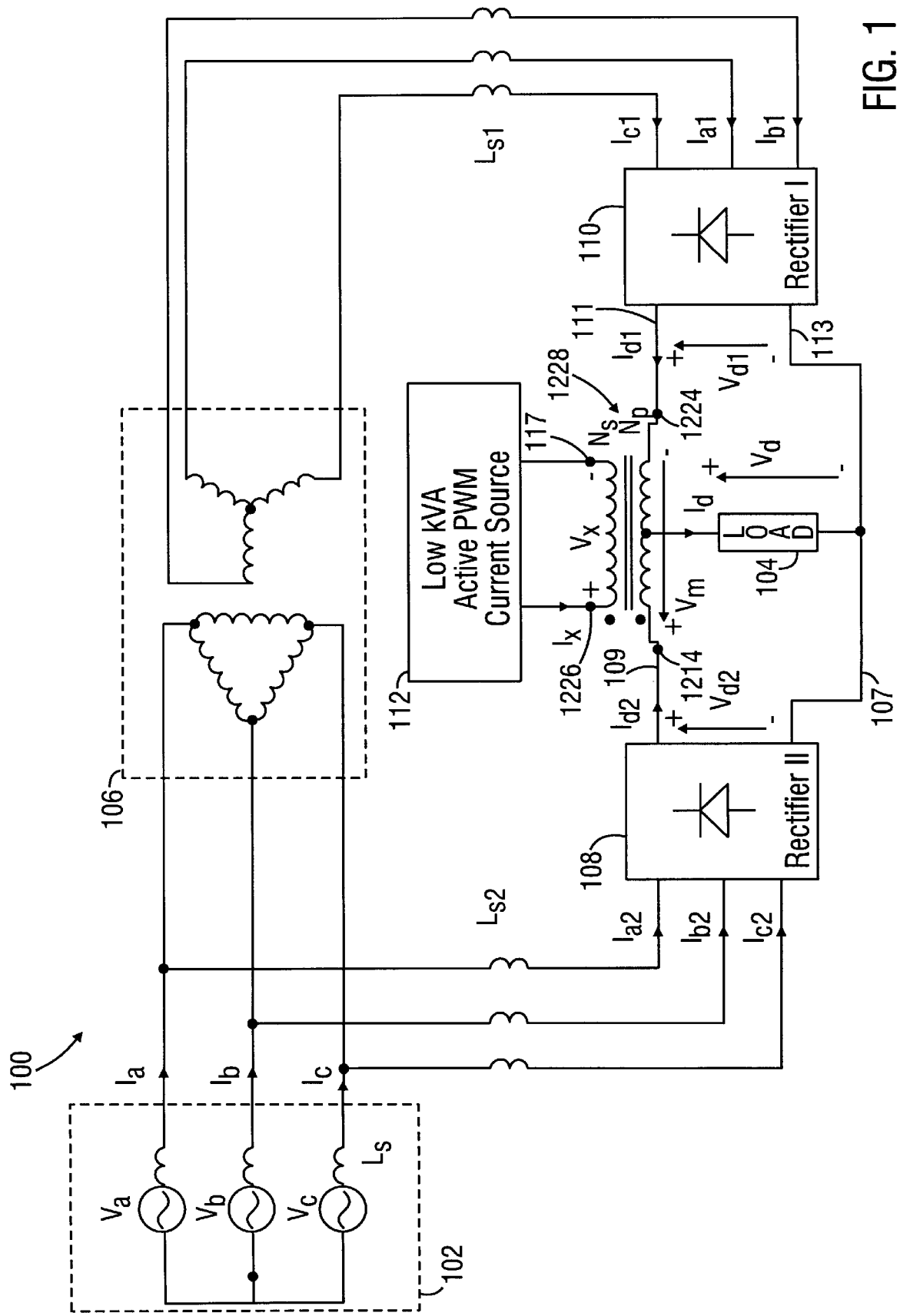
FIG. 1 is a schematic diagram of a power interface system in accordance with one embodiment of the invention.

Referring to FIG. 1, there is shown a circuit diagram of a clean power utility interface system 100 in accordance with one embodiment of the invention. As shown in FIG. 1, the system 100 is adapted to establish an interface between a three phase power source or power utility 102 and a load 104, and is adapted to shape input line currents denoted $I_a$, $I_b$, and $I_c$ in FIG. 1. Load 104 may be, for example, but not by way of limitation, a pulse width modulated adjustable speed AC/DC motor drive, a switch mode power supply, an induction heating system, or any other power electronic converter which accepts a DC-link voltage.

In the presently disclosed embodiment, a main transformer 106 is provided having delta-wye winding (kVA rating of 0.52 Po(PU)) with a √3 to 1 turns ratio to maintain an equal per unit voltage. The windings are connected in such a way as to ensure that two diode bridge rectifiers 108 and 110 have balanced sets of three-phase voltages with 30 degrees of phase shift therebetween.

Each rectifier 108 and 110 is a conventional three-phase diode bridge system adapted to receive a three-phase voltage as input and to derive therefrom a DC output signal presented between positive and negative busses. As such, the details of design and implementation of rectifiers 108 and 110 will not be described herein in detail.

In FIG. 1, the three-phase signal applied to rectifier 108 is characterized by the currents $I_{a2}$, $I_{b2}$, and $I_{c2}$, and the DC output from rectifier 108 is characterized by the voltage $V_{d2}$ between the positive and negative outputs 109 and 107 of rectifier 108 and by the current $I_{d2}$ shown in FIG. 1 on the positive output from rectifier 108. Likewise, the three-phase signal applied to rectifier 110 is characterized by the currents $I_{a1}$, $I_{b1}$, and $I_{c1}$, and the DC output from rectifier 110 is characterized by the voltage $V_{d1}$ between the positive and negative outputs 111 and 113 of rectifier 110 and by the current $I_{d1}$ shown in FIG. 1 on the positive output from rectifier 110. As noted above, transformer 106 is adapted to establish a 30 degree phase shift between the three-phase signal $\{I_{a2}, I_{b2}, I_{c2}\}$ and the three-phase signal $\{I_{a1}, I_{b1}, I_{c1}\}$.

The positive output bus from rectifier 108 is designated with reference numeral 109 and the negative output bus from rectifier 108 is designated with reference numeral 107; that is, the DC output voltage $V_{d2}$ from rectifier 108 is the voltage differential which appears between busses 109 and 107. The positive output bus from rectifier 110 is designated with reference numeral 111 and the negative output bus from rectifier 110 is designated with reference numeral 113, so that the DC output voltage $V_{d1}$ from rectifier 110 is the voltage differential which appears between busses 111 and 113.

The utility interface system 100 of FIG. 1 corresponds generally to a conventional 12-pulse interface system; however, an interphase reactor 114 in the embodiment of FIG. 1 is coupled to a low kVA active pulse width modulation (PWM) current source 112. Current source 112 is adapted to inject a low kVA PWM current into a secondary winding of the interphase reactor 114, in order to shape input line current.

In the presently disclosed embodiment of the invention, interphase reactor 114 is a transformer whose primary winding (corresponding to transformer terminals 1214 and 1224) is disposed between the positive outputs 109 and 111 of the respective rectifiers 108 and 110. Interphase reactor 114 supports the 6th order harmonic voltages and is wound to cancel the DC component of the current produced by rectifiers 108 and 110. In addition, the secondary winding of interphase reactor 114 (corresponding to transformer terminals 1226 and 1228) is coupled between the outputs of the low kVA active pulse width modulation current source 112.

As shown in FIG. 1, load 104 is coupled between interphase reactor 114 and the respective negative output busses 107 and 113 of rectifiers 108 and 110. In the presently disclosed embodiment of the invention, load 104 is preferably coupled to the midpoint of the primary winding of interphase reactor 114, such that the current through load 104 is the sum of the output currents $I_{d2}$ and $I_{d1}$.

With the PWM current source disabled (i.e., with $I_x$=0) the system 100 operates as a conventional 12-pulse rectifier providing cancellation of the 5th and 7th harmonics in the input line currents, $I_a$, $I_b$, and $I_c$. The active current source, when injecting a current $I_x$ into the interphase reactor 114, results in near sinusoidal input current with a unity input power factor.

Waveforms may be analyzed to determine the relationship between current $I_x$ and input currents $I_a$, $I_b$ and $I_c$. With $I_x$=0, input current $I_a$ can be shown to be given by the following equation:

$$I_a = I_{a2} + \frac{1}{\sqrt{3}}(I_{a1} - I_{c1}) \tag{1}$$

Figure 2:
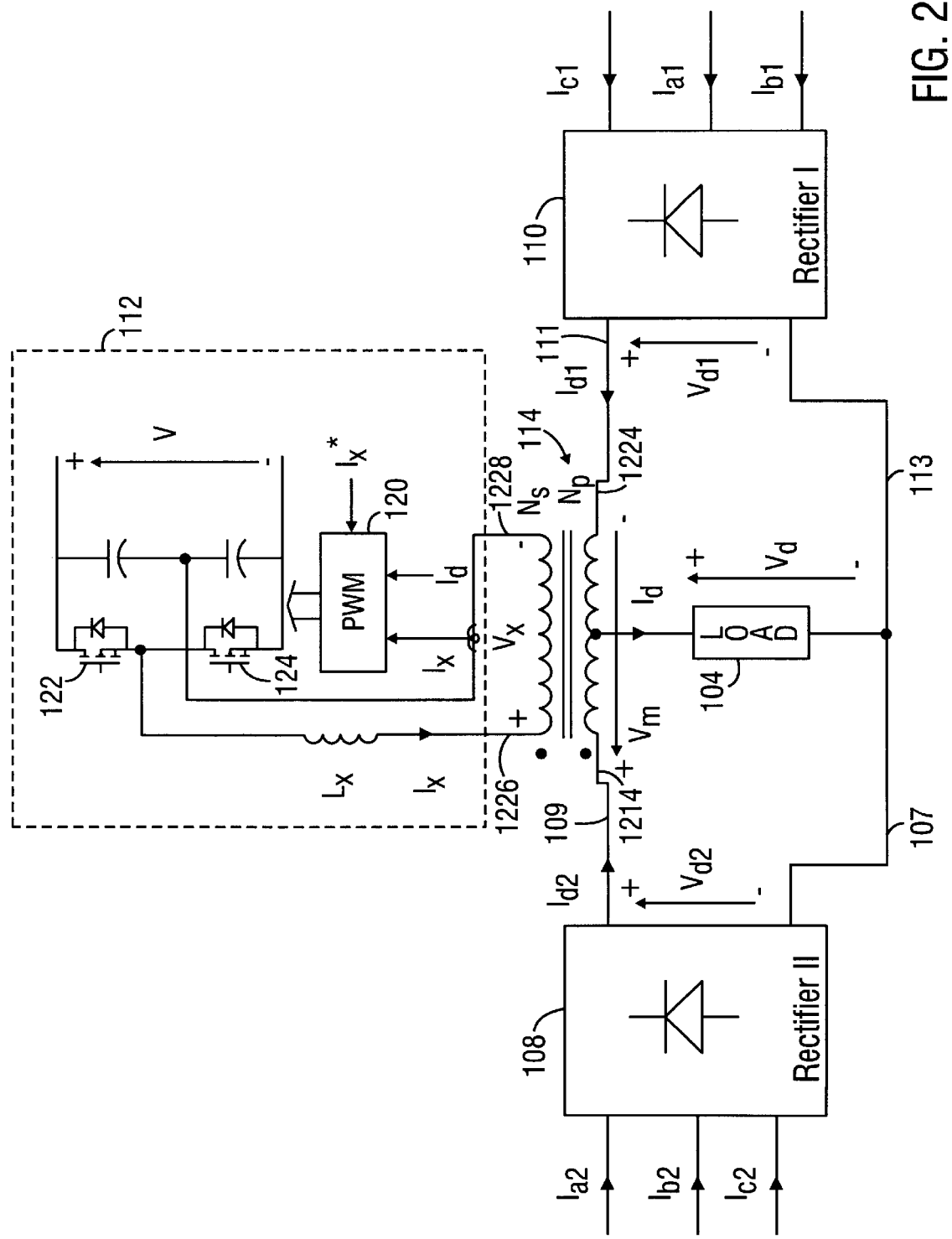
FIG. 2 is a schematic diagram of the system from FIG. 1, showing a pulse width modulation current source therein in additional detail.

Equation (1) describes a 12-pulse input line current with 5th and 7th harmonics absent and $$I_{d1} - I_{d2} = \frac{1}{2}I_d \tag{2}$$

where, as noted above, $I_{d1}$ is the current out of rectifier 110, $I_{d2}$ is the current out of rectifier 108, and $I_d$ is the current through load 104. In accordance with one aspect of the presently disclosed embodiment of the invention, an active current $I_x$ is advantageously injected into the secondary winding 114. FIG. 2 shows one circuit topology for implementing this scheme, in particular showing one embodiment of low kVA active PWM current source 112.

Analyzing the MMF relationship in interphase reactor 114 we have, $$N_p(I_{d2}-I_{d1})=N_s I_x \tag{3}$$

where $N_p$ and $N_s$ are the numbers of turns of the primary and the secondary windings of the interphase reactor, respectively. The load current $I_d$ is given by:

$$I_d = I_{d1} + I_{d2} \tag{4}$$

From Equations (3) and (4) we have:

$$I_{d2} = \frac{1}{2}\left(I_d + \frac{N_s}{N_p}I_x\right) \tag{5}$$

Figure 3:
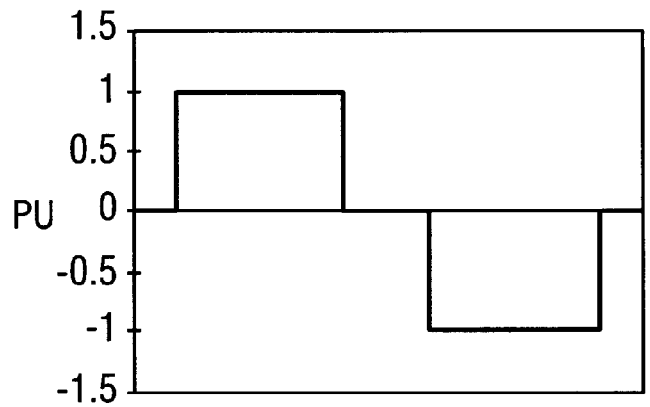
FIG. 3 is a waveform representing the switching function for a rectifier in the system of FIG. 1.

FIG. 3 shows switching function $S_{a1}$ (i.e., the normalized function defining conductance of rectifier 110) for phase "a" of rectifier 110 from FIGS. 1 and 2. The Fourier series expansion for $S_{a1}$ is given by:

$$S_{a1}(t) = \frac{2\sqrt{3}}{\pi}\left(\sin\omega t - \frac{1}{5}\sin 5\omega t - \frac{1}{7}\sin 7\omega t + \frac{1}{11}\sin 11\omega t + \frac{1}{13}\sin 13\omega t ...\right) \tag{6}$$

and for phases "b" and "c", the switching functions can be written as:

$$S_{b1}=S_{a1}<-120°$$
$$S_{c1}=S_{a1}<+120° \tag{7}$$

Similarly, the switching functions for rectifier 108 in FIGS. 1 and 2 with a 30 degree phase shift are:

$$S_{a2}=S_{a1}<-30°$$
$$S_{b2}=S_{b1}<-30°$$
$$S_{c2}=S_{c1}<-30° \tag{8}$$

The input currents for rectifiers 108 and 110 can now be expressed in terms of ii switching functions as:

$$\begin{bmatrix} I_{a1} \\ I_{b1} \\ I_{c1} \end{bmatrix} = \begin{bmatrix} S_{a1} \\ S_{b1} \\ S_{c1} \end{bmatrix} I_{d1} \tag{9}$$

and $$\begin{bmatrix} I_{a2} \\ I_{b2} \\ I_{c2} \end{bmatrix} = \begin{bmatrix} S_{a2} \\ S_{b2} \\ S_{c2} \end{bmatrix} I_{d2} \tag{10}$$

Equation (1) can now be modified using Equation (5) and the switching functions described in Equations (6)–(10) as:

$$I_a = \frac{1}{2\sqrt{3}}(S_{a1} - S_{c1}) \cdot \left(I_d - \frac{N_s}{N_p}I_x\right) + \frac{1}{2}S_{a2}\left(I_d + \frac{N_s}{N_p}I_x\right) \tag{11}$$

Equation (11) illustrates the relationship between $I_x$ and input current $I_a$. For input current $I_a$ to be sinusoidal, $$I_x = \frac{N_p\left[2I_{a,1} - I_d\left(\frac{S_{a1} - S_{c1}}{\sqrt{3}} + S_{a2}\right)\right]}{N_s\left(\frac{S_{c1} - S_{a1}}{\sqrt{3}} + S_{a2}\right)} \tag{12}$$

Note $I_a$ is replaced by $I_{a,1}$ where $I_{a,1}$ is the fundamental rms component of $I_a$. Therefore, equation (12) describes the exact shape of $I_x$ for a given load current $I_d$. Since input power is equal to output power, we have $$\sqrt{3}V_{LL}I_{a,1} = V_d I_d \tag{13}$$

where $V_d$=1.35 $V_{LL}$ and $V_{LL}$ is the line to line rms voltage. Hence, from Equation (13) we have, $$I_{a,1}=0.7794 I_d \tag{14}$$

For input current $I_a$ to be sinusoidal, i.e., for:

$$I_a = \sqrt{2}I_{a,1}\sin\omega t \tag{15}$$

Figure 4A:
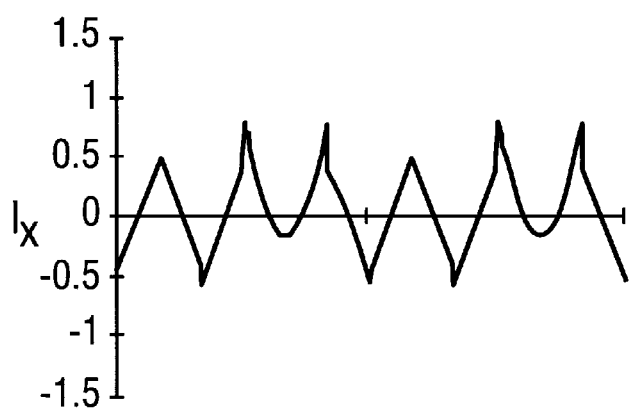
FIG. 4a is a waveform representing injected current in the system of FIG. 1.
Figure 4B:
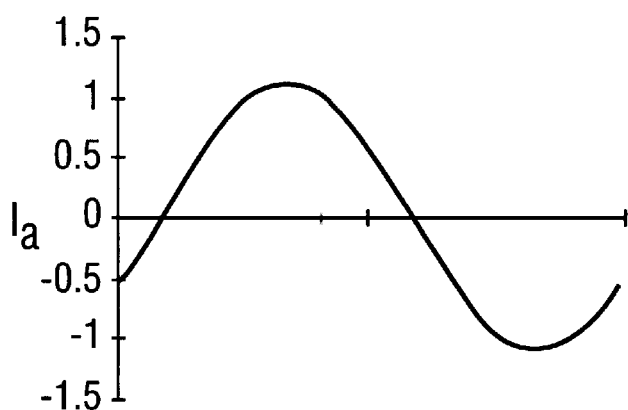
FIG. 4b is a waveform representing input line current in the system of FIG. 1.

FIG. 4a shows the shape of $I_x$ for sinusoidal input current computed from Equations (12) and (15). FIG. 4b shows the resultant essentially pure sinusoidal input line current $I_a$.

Figure 5A:
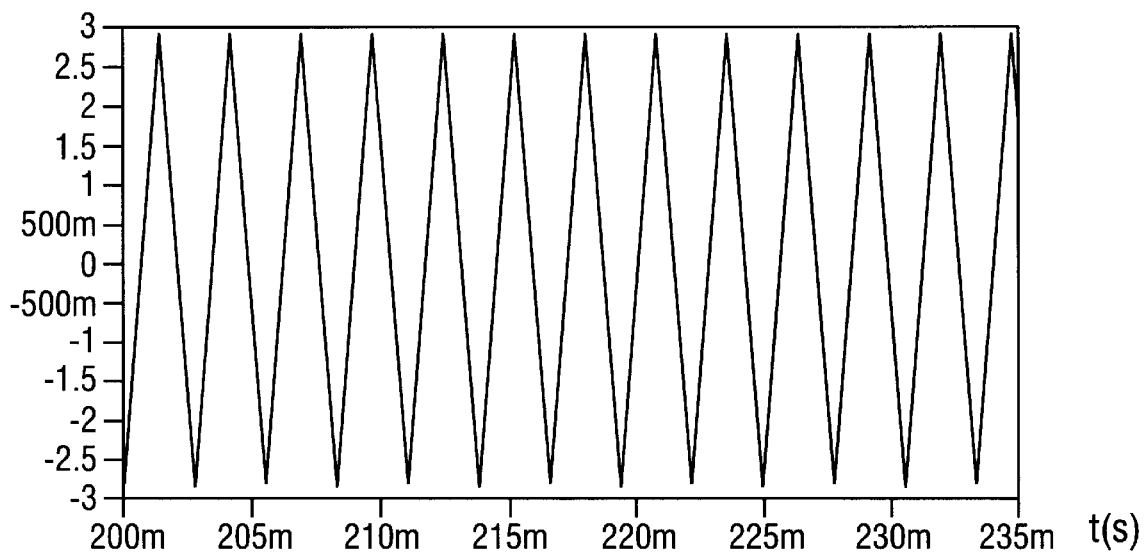
FIG. 5a is a simulated waveform representing injected current in the system of FIG. 1.
Figure 5B:
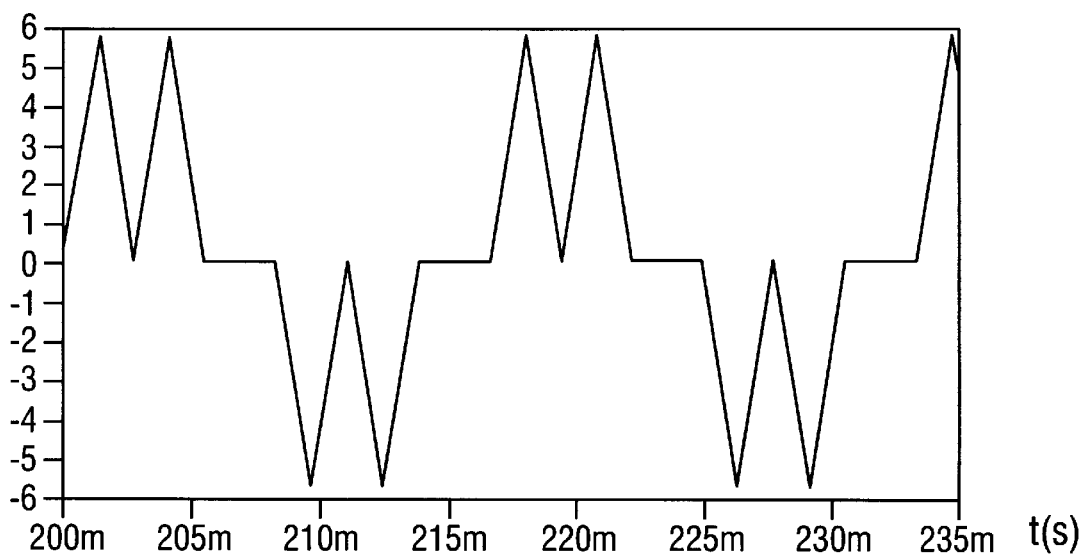
FIG. 5b is a simulated waveform representing rectifier input current in the system of FIG. 1.
Figure 5C:
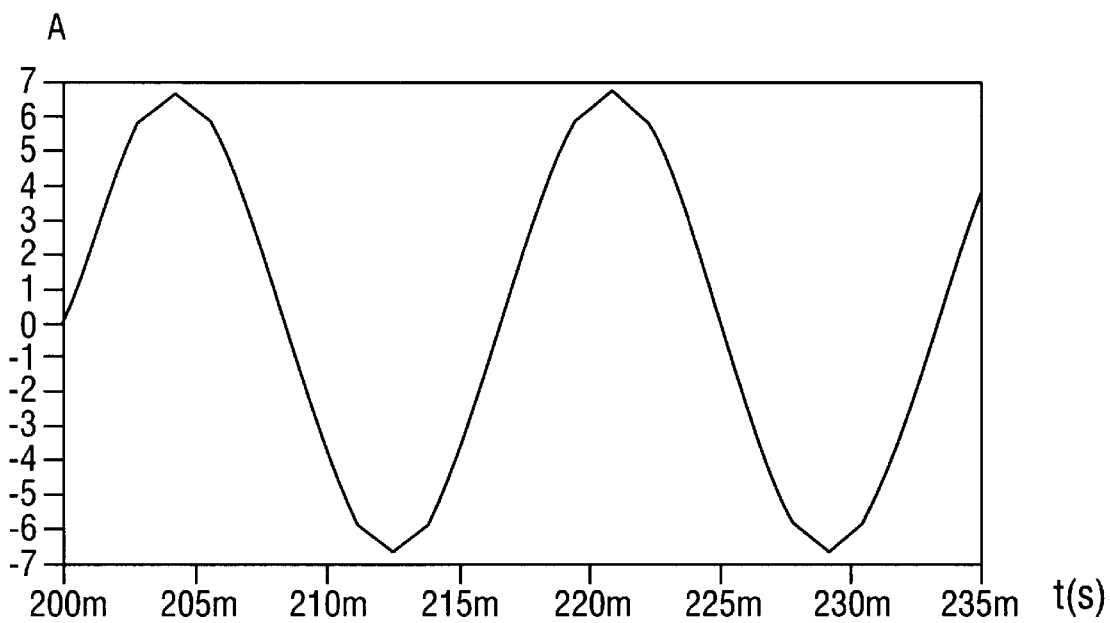
FIG. 5c is a simulated waveform representing input line current in the system of FIG. 1.
Figure 5D:
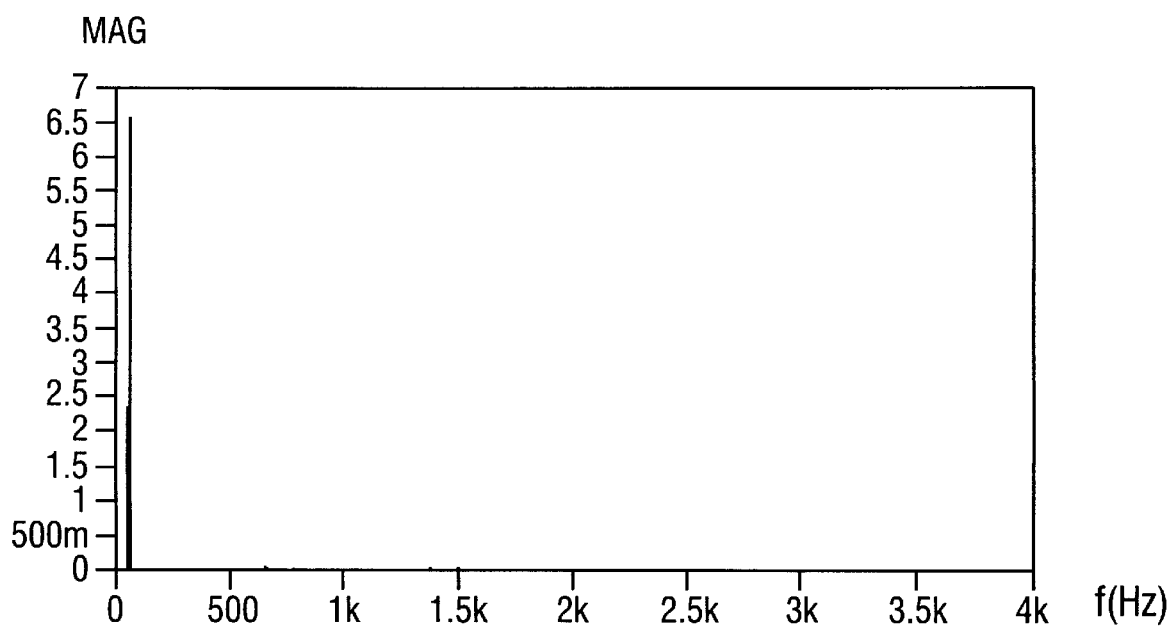
FIG. 5d is a simulated waveform representing the frequency spectrum of the input current in the system of FIG. 1.

From FIG. 4a, it is apparent that $I_x$ is substantially triangular in shape. For the purposes of simulating the system 100 of the presently disclosed embodiment, the injected current $I_x$ can be assumed to be a triangular wave shape, as shown in FIG. 5a. In simulations of the system 100, this injected current yields a near sinusoidal input current $I_a$, as shown in FIG. 5c, the frequency spectrum of line current $I_a$ being shown in FIG. 5d.

Figure 6A:
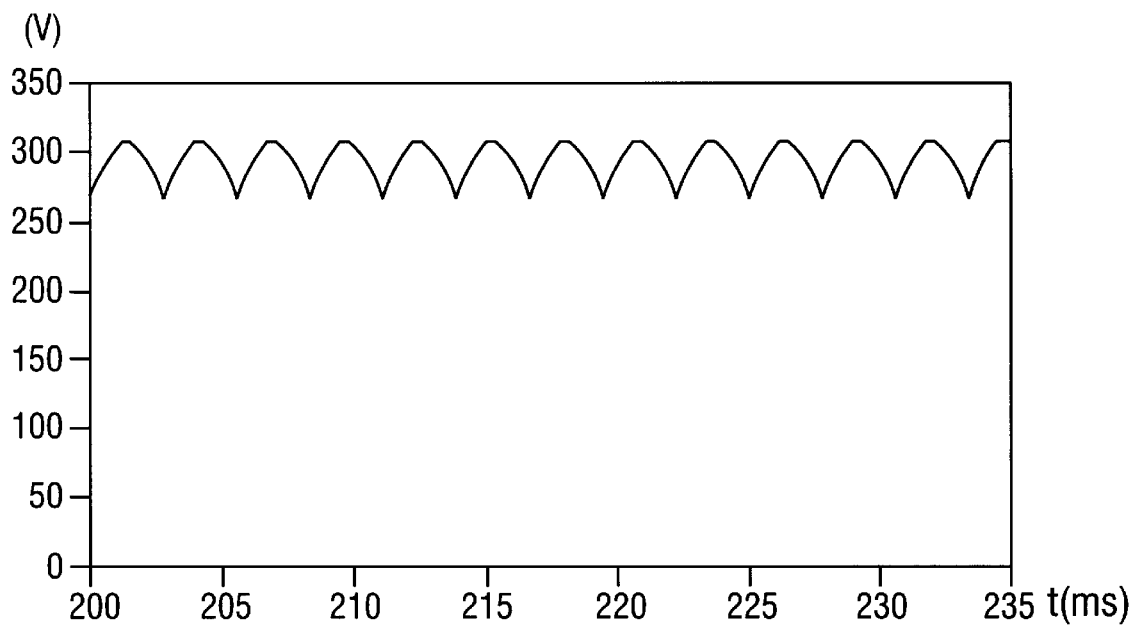
FIG. 6a is a simulated waveform representing the output voltage of a rectifier in the system of FIG. 1.
Figure 6B:
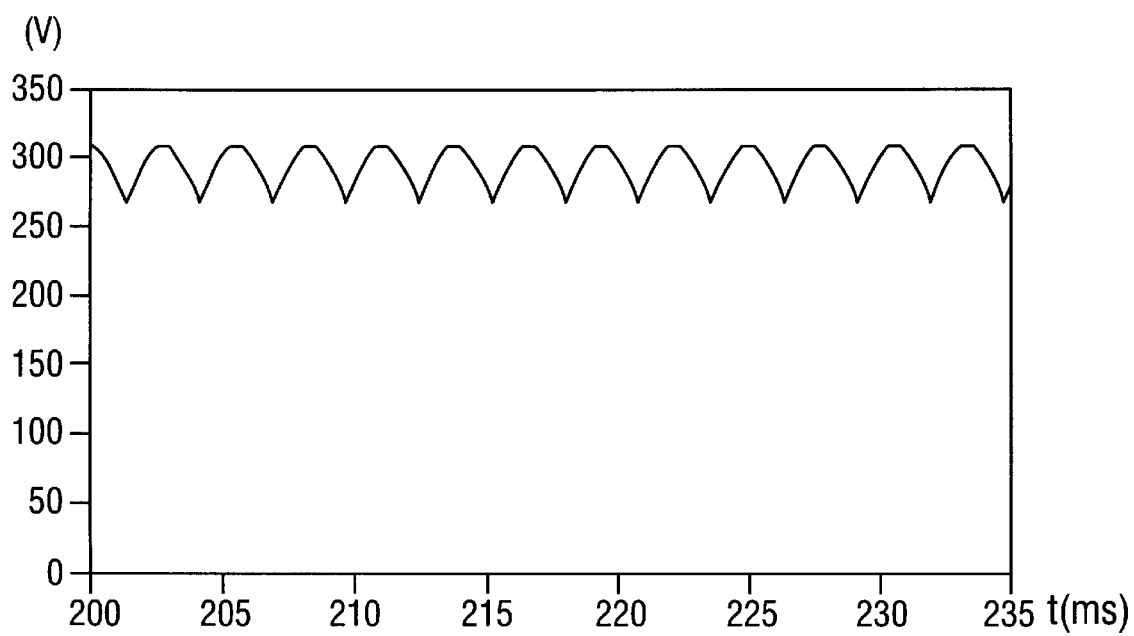
FIG. 6b is a simulated waveform representing the output voltage a second rectifier in the system of FIG. 1.
Figure 6C:
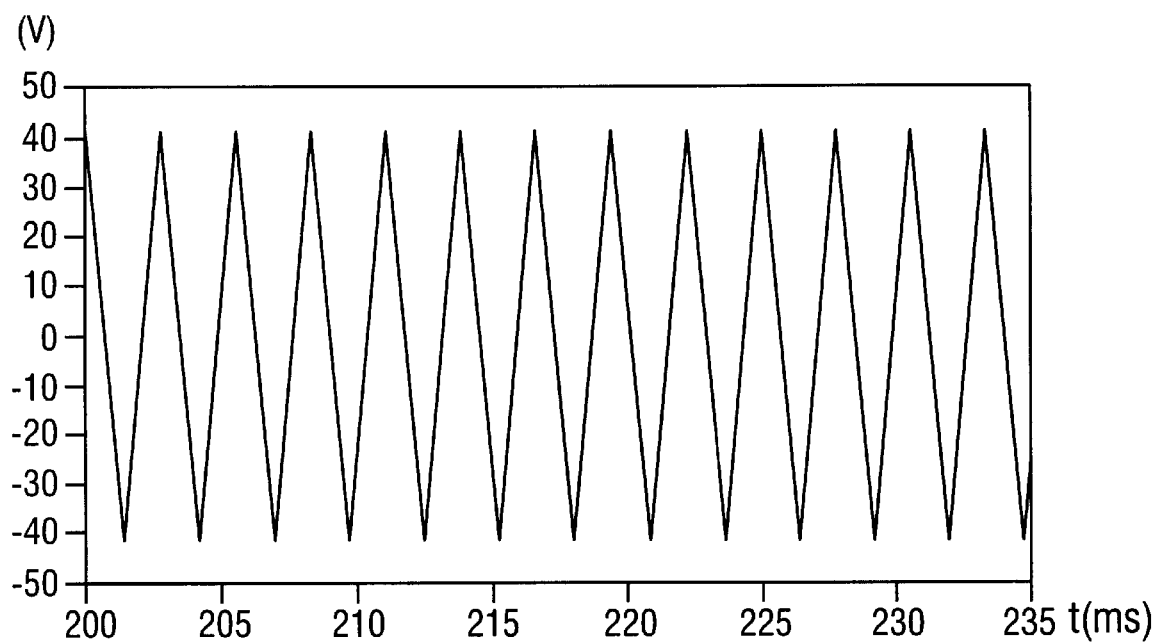
FIG. 6c is a simulated waveform representing the voltage across the interphase reactor in the system of FIG. 1.

Furthermore, generating a triangular injection current $I_x$ into the secondary of the interphase reactor can be accomplished by means of a PWM-controlled current source (to be hereinafter described in further detail). FIG. 5b shows the input current of the rectifier blocks 108 and 110 as a result of the injected current $I_x$. FIG. 5c shows the input line current FIGS. 6a and 6b show the DC output voltages $V_{d1}$ and $V_{d2}$, respectively of rectifiers 110 and 108. FIG. 6c shows the voltage $V_m$ across the primary winding of interphase reactor 114.

It should be noted that the injected active current $I_x$ (FIG. 5a), which is triangular in shape, yields near sinusoidal input currents (FIG. 5c) of less than 1% THD. The kVA rating of the injected current is small, as will be hereinafter discussed.

The line-to-line rms input voltage $V_{LL}$ and DC output current $I_d$ is assumed to be 1 per unit. The voltage $V_m$ across the interphase reactor 114 (see FIG. 1) can be expressed as:

$$V_m = V_{d2} - V_{d1} \tag{16}$$

FIG. 6a and 6b show the waveshape of $V_{d1}$ and $V_{d2}$. Furthermore, $V_{d1}$ can be expressed in Fourier series as:

$$V_{d1} = \sqrt{2}\, V_{LL} \frac{6}{\pi} \sin\frac{\pi}{6} \left(1 - \sum_{n=6,12,18,\ldots}^{\infty} \frac{2}{n^2-1} \cos\frac{n\pi}{6} \cos n\omega t \right) \tag{17}$$

Output voltage $V_{d2}$ is phase shifted by 30 degrees. By substituting Equation (17) into Equation (16), $V_m$ can be expressed as:

$$V_m = -5.4018 V_{LL} \sum_{n=6,12,18,\ldots}^{\infty} \frac{1}{n^2-1} \cos\frac{n\pi}{6} \sin\frac{n\pi}{12} \sin n\left(\omega t - \frac{\pi}{12}\right) \tag{18}$$

From Equation (18), the rms value of $V_m$ can be computed as:

$$V_{m,rms} = 0.1098 V_{LL} \tag{19}$$

The voltage $V_x$ across the interphase reactor secondary winding is given by, $$V_x = \frac{N_s}{N_p} V_m \tag{20}$$

Then, from Equations (19) and (20) the rms value of $V_x$ is, $$V_{x,rms} = 0.1098 V_{LL} \frac{N_s}{N_p} \tag{21}$$

As discussed above, the peak value of the current $I_x$ of FIG. 5a is $0.5 I_d$. Therefore, the rms value of $I_x$ for a triangular waveshape is:

$$I_{x,rms} = \frac{0.5}{\sqrt{3}} I_d \frac{N_p}{N_s} = 0.2887 I_d \frac{N_p}{N_s} \tag{22}$$

The rms value of $I_x$ can be reduced by adjusting turns ratio ($N_p/N_s$) between the primary and the secondary windings of the interphase reactor 114.

From Equations (21) and (22), the kVA rating of the injected current source, $kVA_{INV}$, can be computed as, $$\begin{aligned} kVA_{INV} &= V_{x,rms} \cdot I_{x,rms} \\ &= 0.0227 P_0 (PU) \end{aligned} \tag{23}$$

Equation (23) shows that the kVA rating of the injected current source $I_x$ is a small percentage of the output power. This demonstrates the superior features of the system 100 in accordance with the presently disclosed embodiment of the invention to a realize clean power utility interface.

Figure 7:
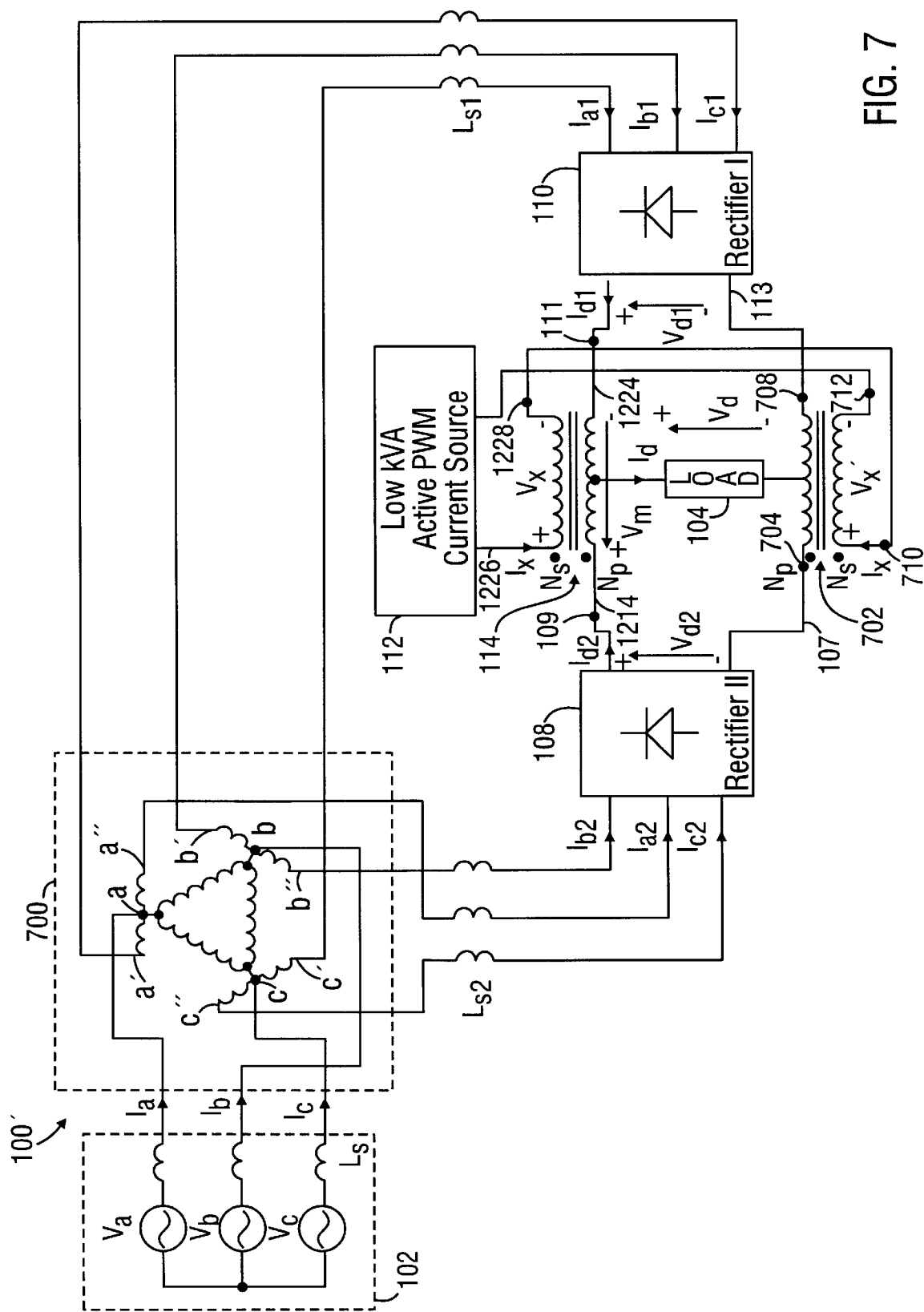
FIG. 7 is a schematic diagram of a power interface system in accordance with an alternative embodiment of the invention.

Referring now to FIG. 7, there is shown a circuit diagram of active interphase reactor system 100' in accordance with an alternative embodiment of the invention. It is to be understood that those elements of the system 100' in FIG. 7 which are substantially identical to those in the system of FIGS. 1 and 2 will retain identical reference numerals in FIG. 7.

Figure 8:
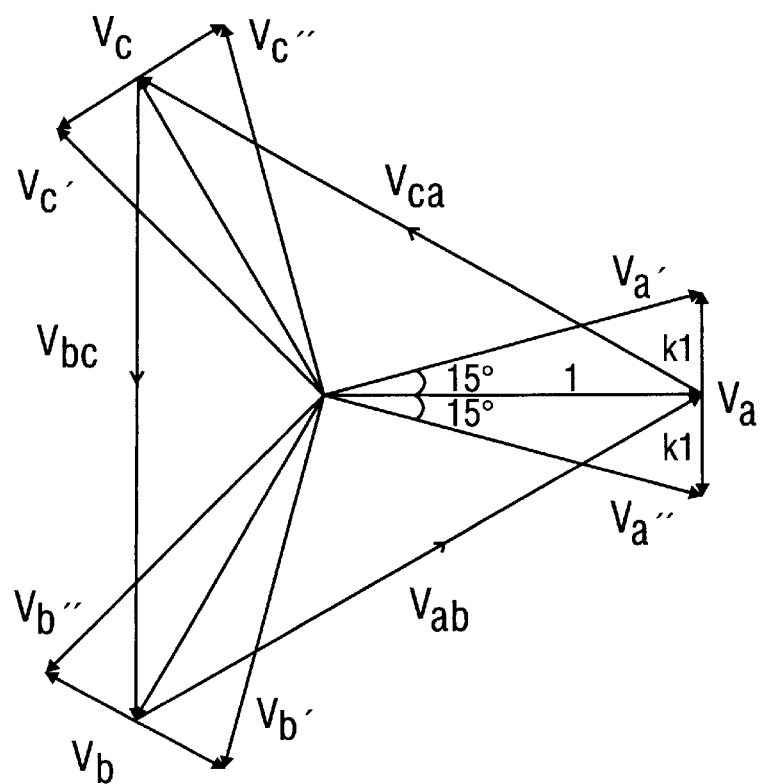
FIG. 8 is a vector diagram of an autotransformer connection in the system of FIG. 7.

FIG. 7 shows the clean power utility interface implementation 100' whose main transformer 700 has an autotransformer connection. The autotransformer configuration shown in FIG. 7 does not have ohmic isolation and allows for smaller magnetic sizes. ii FIG. 8 shows the vector diagram of the delta type autotransformer 600. The autotransformer 600 generates two three-phase sets of voltages $\{I_{a1}, I_{b1}, I_{c1}\}$, and $\{I_{a2}, I_{b2}, \text{and } I_{c2}\}$, displaced ±15 degrees respectively from the input supply, as shown in the vector diagram of FIG. 8.

With continued reference to FIG. 7, system 100' in accordance with the presently disclosed embodiment of the invention includes a second interphase reactor 602 disposed between the respective negative busses 107 and 113 of rectifiers 108 and 110, in addition to interphase reactor 114 previously discussed. The autotransformer configuration maintains a virtual ground about the midpoint of rectifiers 108 and 110. This requires application of two interphase reactors 114 and 702. As shown in FIG. 7, the respective secondary windings of the first and second interphase reactors 114 and 702, respectively, are coupled in series between the outputs of the low kVA active PWM current source 112, such that the injected compensation current $I_x$ is injected into the secondary windings of both interphase reactors 114 and 702.

In FIG. 7, the primary winding of interphase reactor 702 correspond to transformer terminals designated 704 and 708, while the secondary winding corresponds to transformer terminals 710 and 712.

Figure 9:
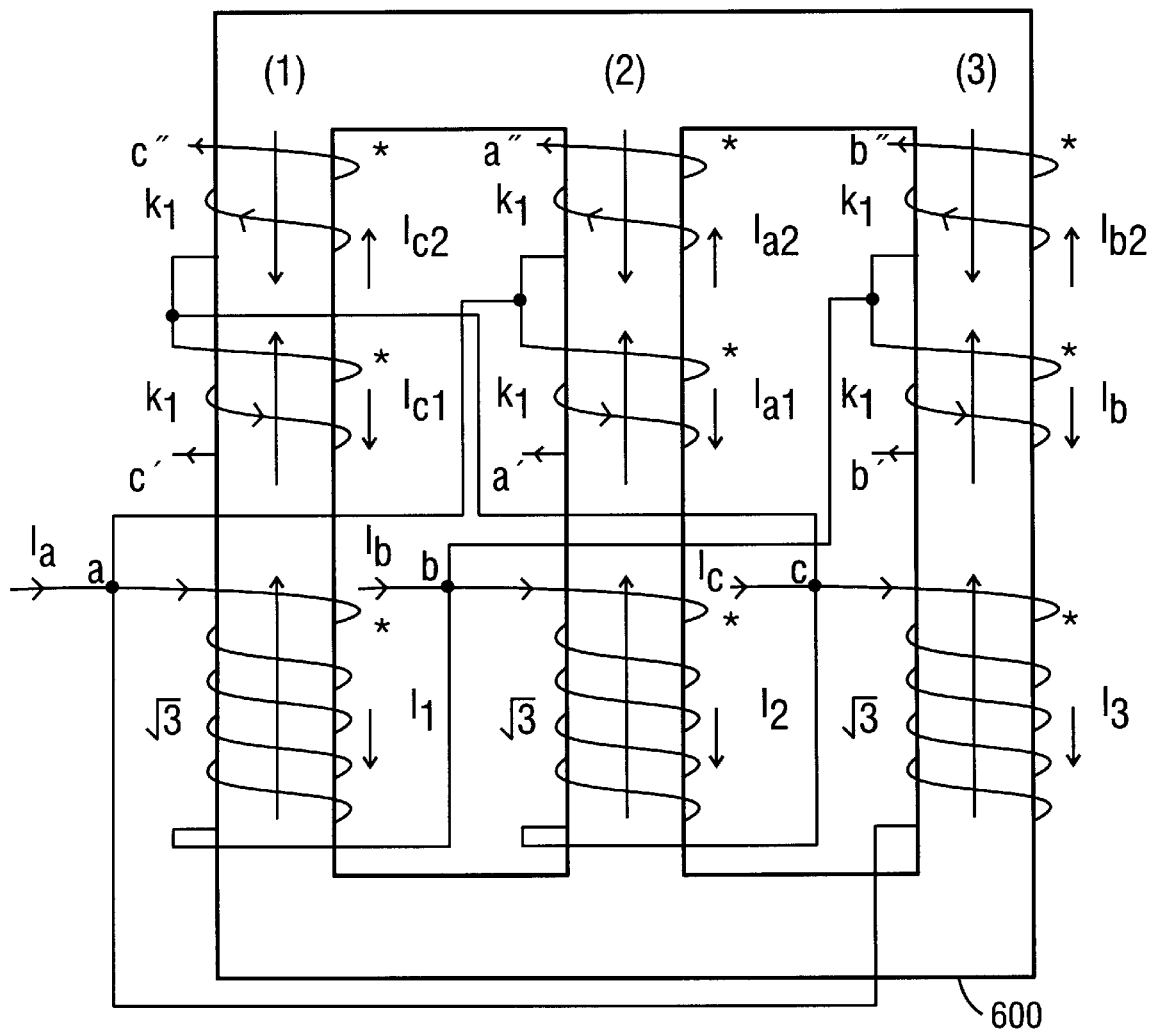
FIG. 9 is a diagram showing currents in the autotransformer windings on a three-limb core of the autotransformer in the system of FIG. 7.

FIG. 9 shows the resulting autotransformer winding arrangement on a three limb core of transformer 600. It has been shown that the kVA rating of the delta type autotransformer 600 is 0.18 Po (PU). FIG. 8 shows the vector diagram of the autotransformer winding arrangements. The autotransformer terminals a, b, and c are connected to the three phase utility supply 102 (see FIG. 7). Each limb of the autotransformer consists of three windings as shown in FIG. 9. Two windings are of length k1 and the third winding is of length $\sqrt{3}$. From FIG. 8, a value of k1=0.2679 is shown to produce a phase shift of ±15 degrees (FIG. 8). The autotransformer connections therefore generate two sets of three phase outputs: $\{a', b', c'\}$ connected to rectifier 110 and $\{a'', b'', c''\}$ connected to rectifier 108. The currents $\{I_{a1}, I_{b1}, I_{c1}\}$ are rectifier 110 input currents and currents $\{I_{a2}, I_{b2}, I_{c2}\}$ are rectifier 108 currents, respectively.

Referring again to FIG. 7, in accordance with the presently disclosed embodiment of the invention, a current source $I_x$ is injected through the series-connected secondary windings of interphase reactors 114 and 602 such that the utility line currents $\{I_a, I_b, I_c\}$ are substantially sinusoidal in shape. The switching function analysis discussed above can be repeated for the embodiment of FIG. 7. Input current $I_a$ can be expressed as:

$$I_a = \frac{N_s}{2N_p} \cdot \{S_{a2} - S_{a1} + 0.1547(S_{c1} - S_{b1} + S_{c2} - S_{b2})\} \cdot I_x + \frac{1}{2}\{S_{a1} + S_{a2} + 0.1547(S_{b1} - S_{c1} + S_{c2} - S_{b2})\} \cdot I_d \tag{24}$$

For the triangular-shaped injected current $I_x$ of FIG. 5a, the input line current $I_a$, expressed as in Equation (24), also becomes substantially sinusoidal in shape and approximates that shown in FIG. 5c.

As noted above, FIG. 2 shows the circuit diagram for implementing the proposed active current source 112 in accordance with the presently disclosed embodiments of the invention. Injected current $I_x$ shown in FIG. 5a is generated via a current controlled PWM inverter 120 which drives a pair of insulated gate bipolar transistors (IGBTs) 122 and 124 (or similar switching devices, as would be apparent to those of ordinary skill in the art).

Figure 10:
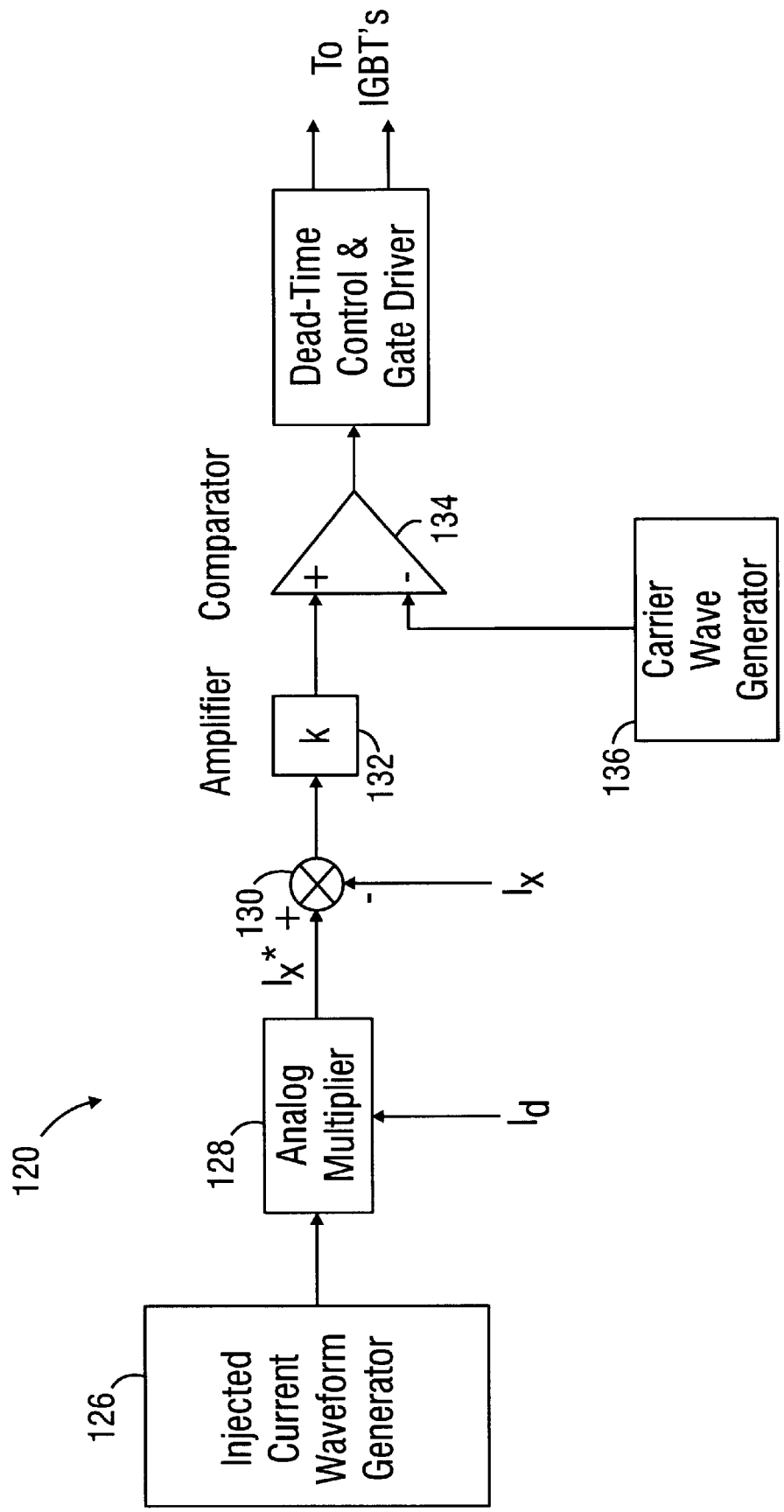
FIG. 10 is a block diagram of a current controlled pulse width modulation gating signal generator in the system of FIG. 7.

A block diagram of the PWM inverter 120 is shown in FIG. 10. As shown in FIG. 10, inverter 120 comprises an injected current waveform generator or reference generator 126, which in the presently disclosed embodiment of the invention is an electrical circuit adapted to generate a triangular waveform. The output of waveform generator 126 is multiplied by the load current $I_d$ by analog multiplier 128 to generate the reference current $I_a^*$.

The reference for the injected current ($I_x^*$) is synchronized with the input voltages and is configured with standard digital logic circuits and phase locked loop electronics. The reference current $I_x^*$ and the feedback current $I_x$ are compared by application to a summing/differencing circuit 130 whose output is applied to an amplifier 132 to generate a current error signal. The current error is then compared to a triangular carrier wave (25 kHz) by comparator 134 to generate the PWM gating signals for the inverter switching devices. The carrier wave is generated by carrier wave generator 136. The closed loop operation of this scheme ensures $I_x$ to follow $I_x^*$ to accomplish the clean power characteristics.

Figure 11A:
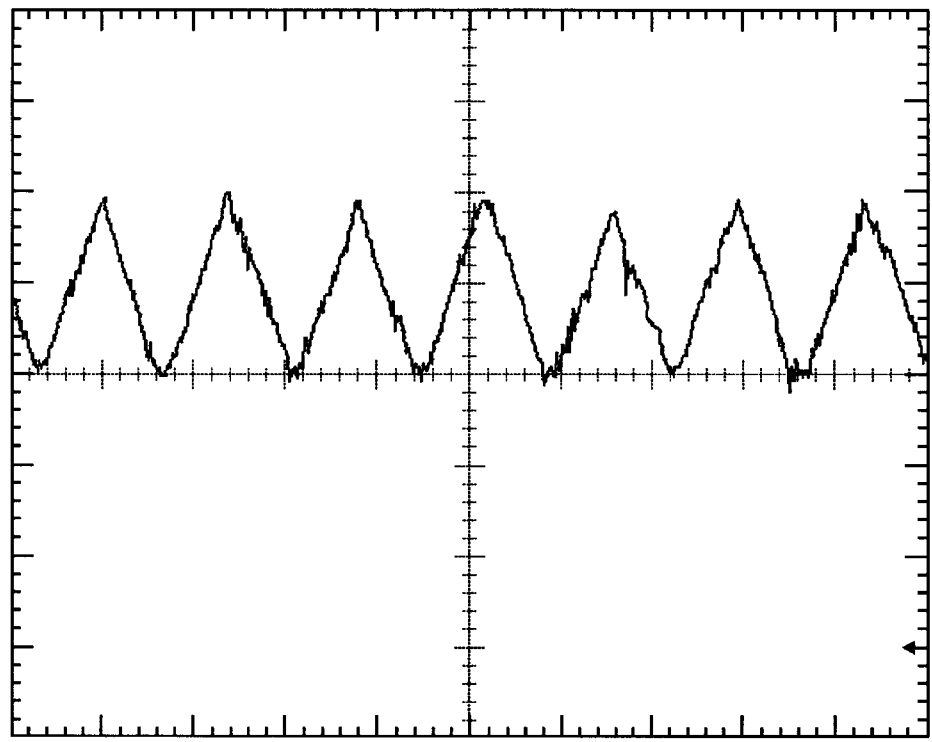
FIG. 11a is a waveform representing a first rectifier output current in the system of FIG. 1.
Figure 11B:
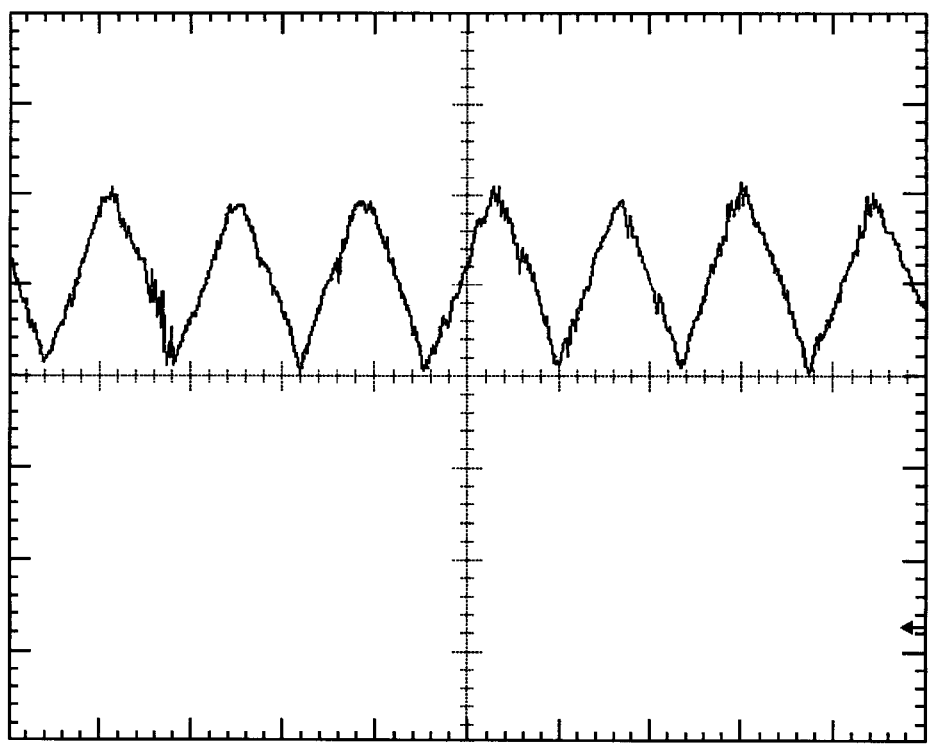
FIG. 11b is a waveform representing a second rectifier output current in the system of FIG. 1.
Figure 11C:
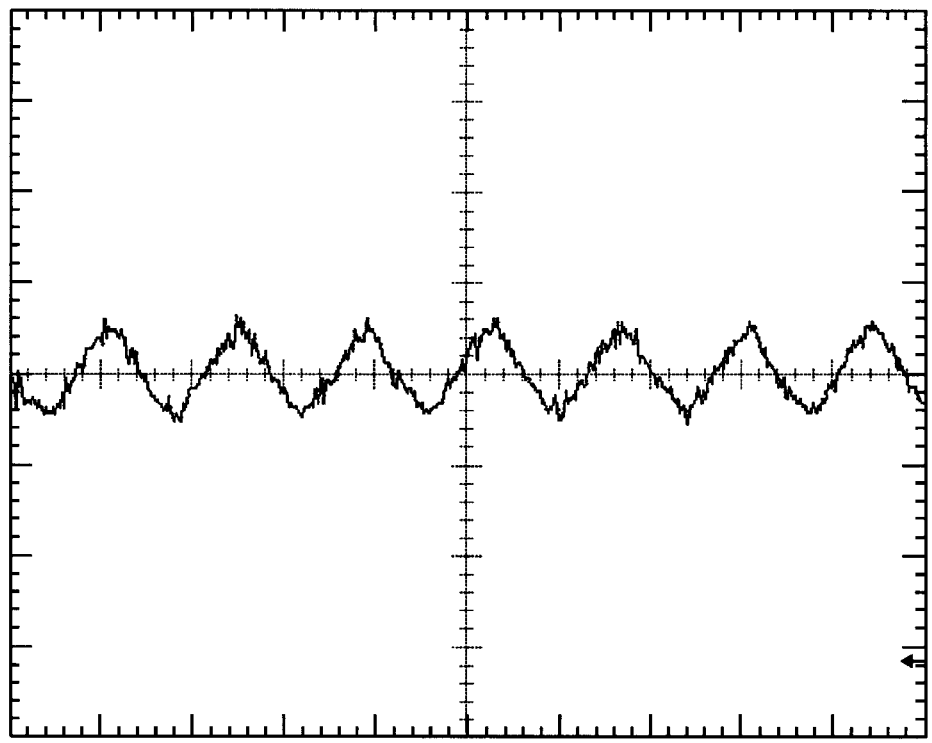
FIG. 11c is a waveform representing injected current in the system of FIG. 1.
Figure 11D:
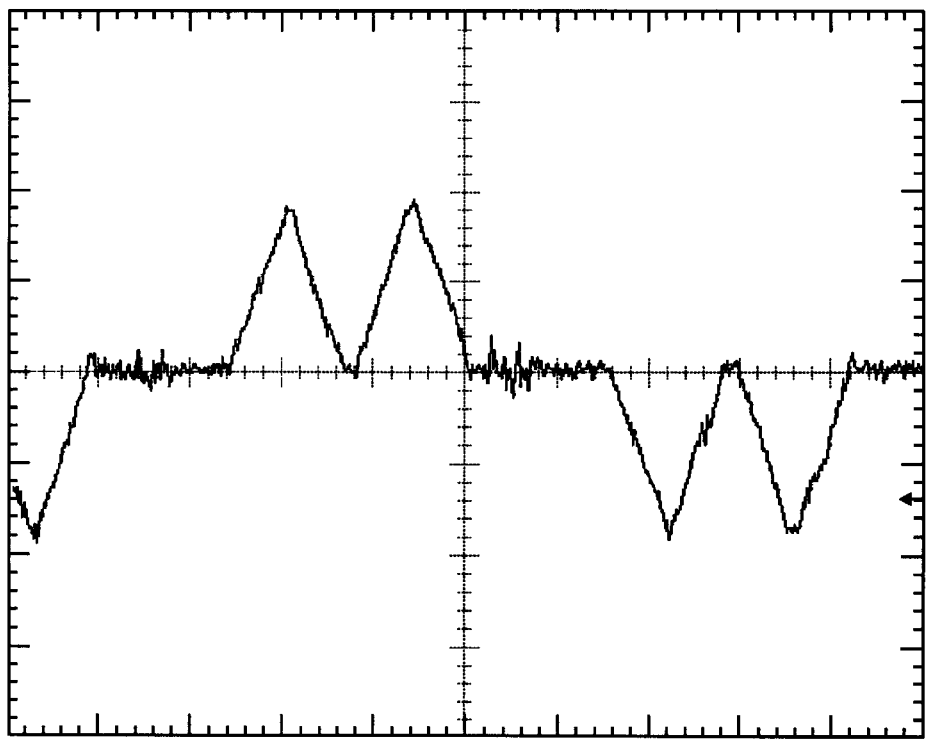
FIG. 11d is a waveform representing rectifier input current in the system of FIG. 1.
Figure 11E:
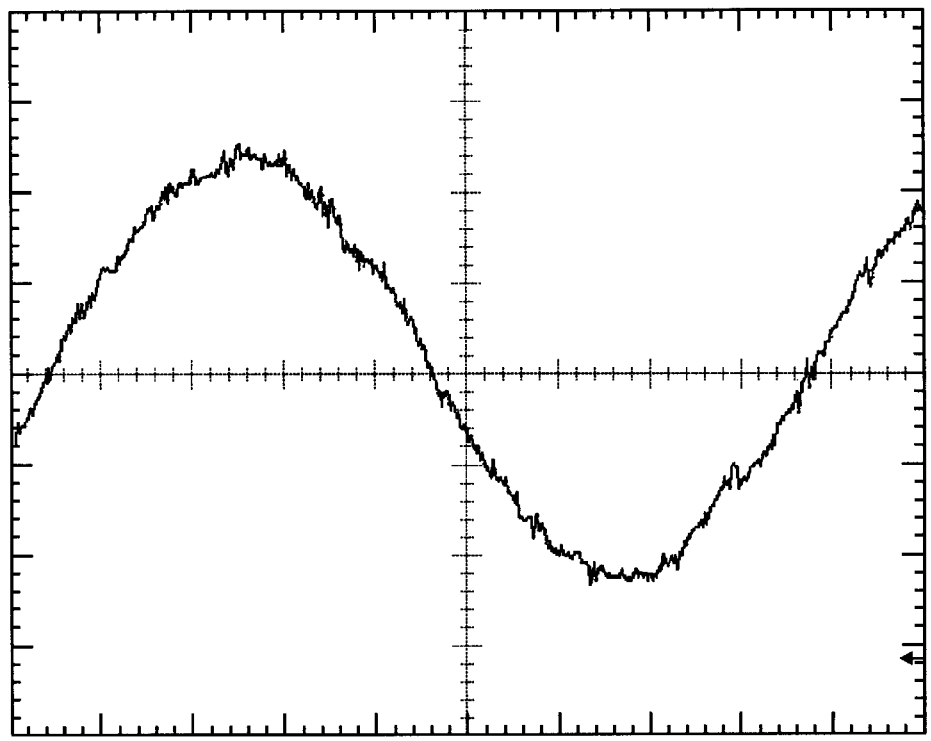
FIG. 11e is a waveform representing input line current in the system of FIG. 1.
Figure 11F:
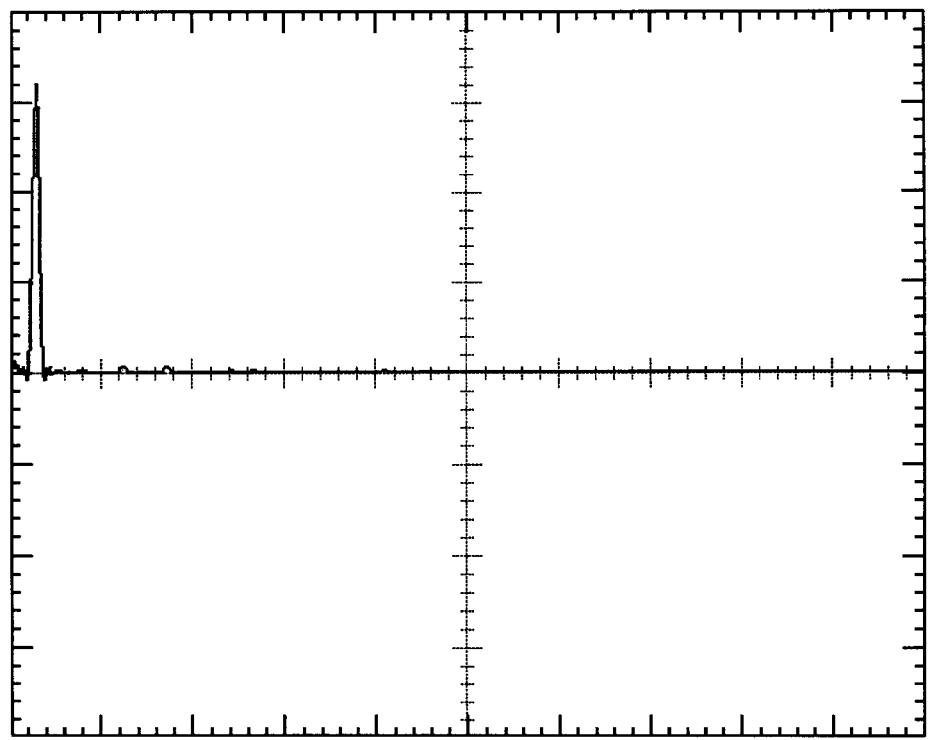
FIG. 11f is a waveform representing the frequency spectrum of input current in the system of FIG. 1.

FIGS. 11a through 11f illustrate some experimental results obtained through implementation of a system in accordance with the embodiment of the invention described above with reference to FIGS. 1 and 2. FIG. 11c shows the injected current $I_x$ and FIGS. 11a and 11b show the resulting rectifier output currents $I_{d1}$ and $I_{d2}$, respectively. FIG. 11d shows the rectifier input current $I_{a1}$. Finally, the utility input current $I_a$ and its frequency spectrum are shown in FIGS. 11e and 11f, respectively. These results are similar to the simulation results shown in FIGS. 5a through 5d. Experimental results show agreement between theory and practice and demonstrate clean power characteristics of the proposed scheme.

Figure 12:
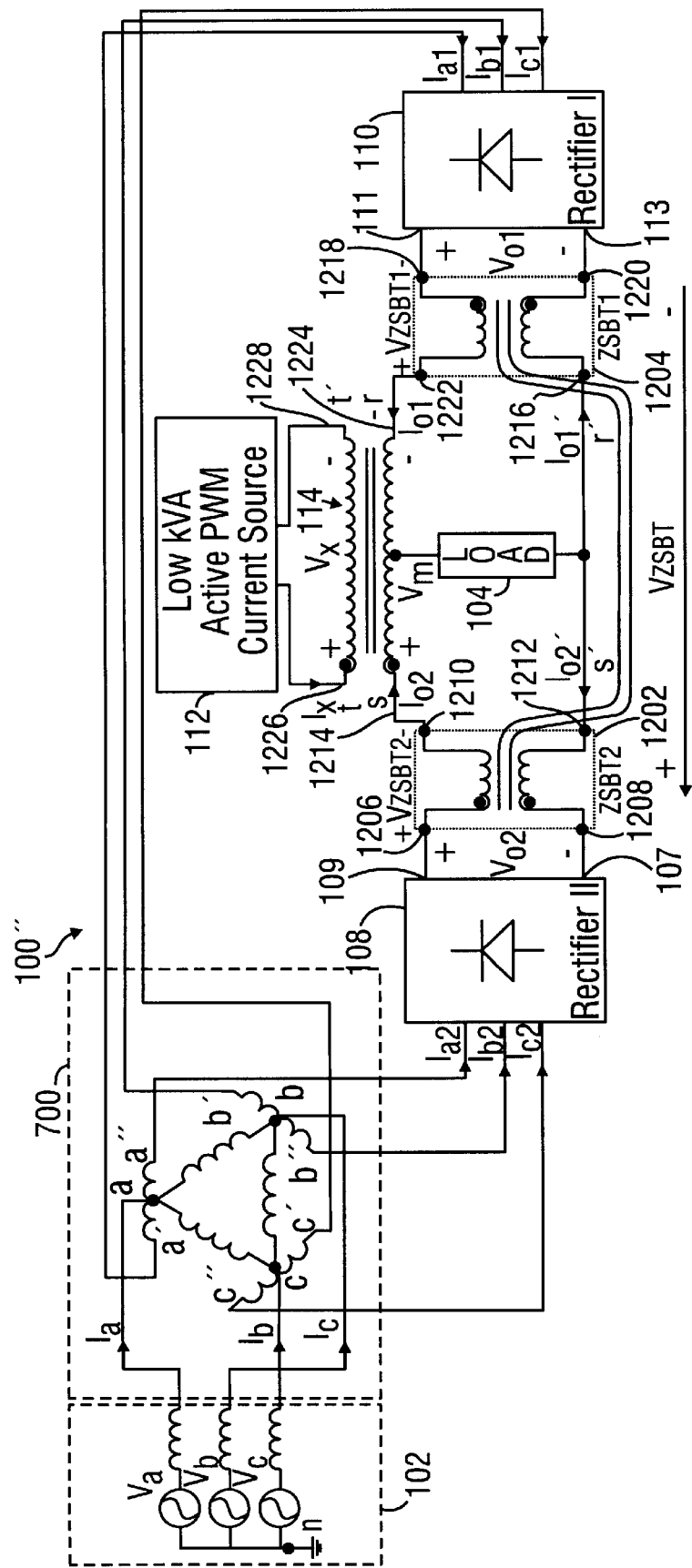
FIG. 12 is a schematic diagram of a power interface system in accordance with another alternative embodiment of the invention.

Referring now to FIG. 12, there is shown a circuit diagram of active interphase reactor system 100" in accordance with another alternative embodiment of the invention. It is to be understood that those elements of the system 100" in FIG. 12. which are substantially identical to those in the system of previous embodiments will retain identical reference numerals in FIG. 12.

In system 100", an autotransformer 700' is employed to obtain 30 degrees phase shift (rather than 15 degrees, as in the embodiment of FIG. 7) between diode rectifiers 108 and 110, along with two zero sequence blocking transformers 1202 and 1204. The two zero sequence blocking transformers 1202 and 1204 are built on one core and are shown in more detail in FIG. 13a.

Zero-sequence blocking transformers 1202 and 1204 function to block zero-sequence voltage components in the respective outputs of rectifiers 108 and 110. This function enables rectifiers 108 and 110 to operate independently. In addition, as will be appreciated by those of ordinary skill in the art, the addition of the two zero sequence blocking transformers 1202 and 1204 renders the inclusion of interphase reactor 602 from the embodiment of FIG. 7 unnecessary.

As shown in FIG. 12, the positive output 109 of rectifier 108 is applied to one terminal 1206 of zero sequence blocking transformer 1202, and the negative output 107 of rectifier 108 is applied to another terminal 1208 of zero sequence blocking transformer 1202. A terminal 1210 of zero sequence blocking transformer 1202 is applied to one terminal 1214 of the primary winding of interphase reactor 114, this connection establishing the current path for current designated $i_{o2}$ in FIG. 12. Another terminal 1212 of zero sequence blocking transformer 1202, the current path for current designated $i_{o2'}$, is coupled to a terminal 1216 of zero sequence blocking transformer 1204.

Likewise, the positive output 111 of rectifier 110 is applied to one terminal 1218 of zero sequence blocking transformer 1204, and the negative output 113 of rectifier 110 is applied to another terminal 1220 of zero sequence blocking transformer 1204. A terminal 1222 of zero sequence blocking transformer 1222 is applied to one terminal 1224 of the primary winding of interphase reactor 114, this connection establishing the current path for current designated $i_{o1}$ in FIG. 12. Another terminal 1216 of zero sequence blocking transformer 1204, the current path for current designated $i_{o1'}$, is coupled to terminal 1212 of zero sequence blocking transformer 1202, as noted above.

The two terminals of interphase reactor's secondary winding are designated 1226 and 1228 in FIG. 12.

Figure 13B:
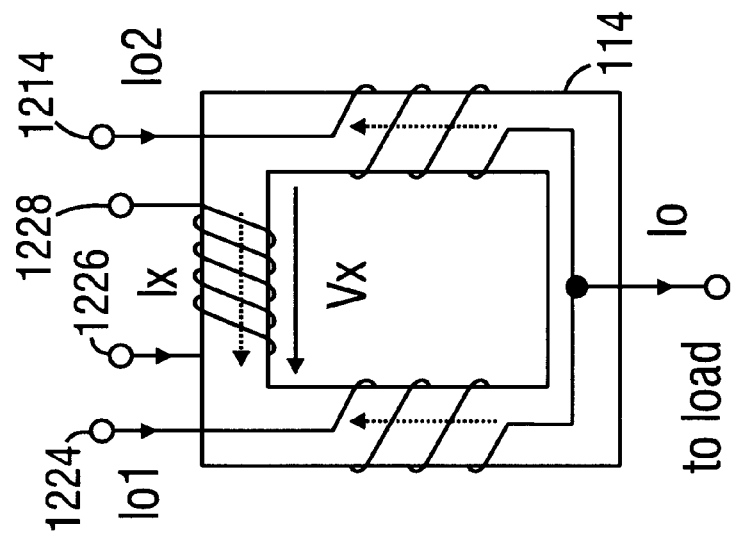
FIG. 13b is a diagram showing the winding configuration of and currents in an interphase reactor in the embodiment of FIG. 12.
Figure 13A:
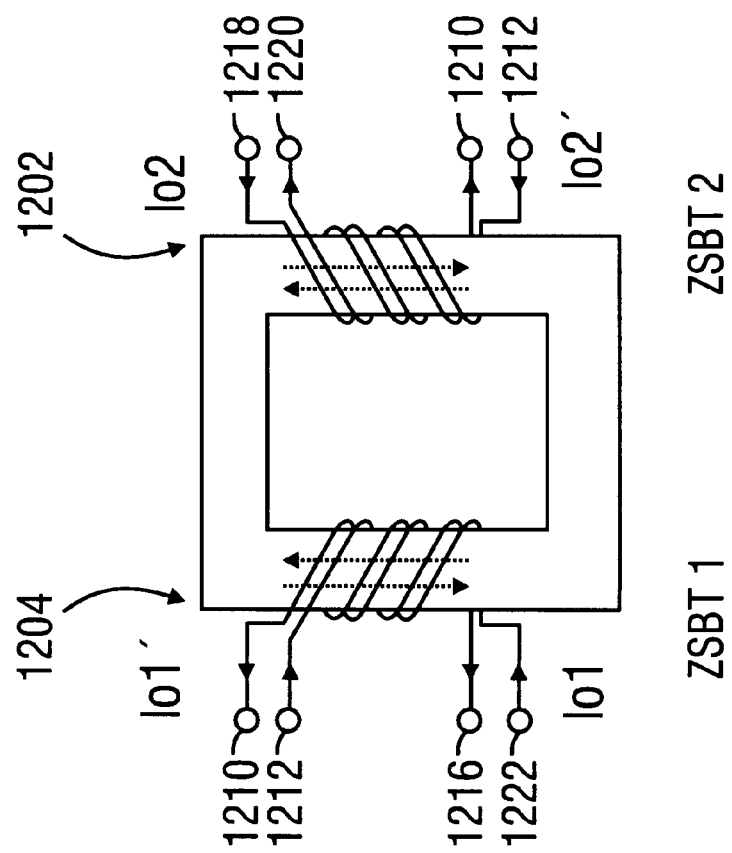
FIG. 13a is a diagram showing the winding configuration of and currents in two zero sequence blocking transformers in the embodiment of FIG. 12.

FIG. 13a shows the winding configuration of and currents $i_{o1}$, $i_{o1'}$, $i_{o2}$ and $i_{o2'}$ conducted in zero sequence blocking transformers 1202 and 1204 from FIG. 12. FIG. 13b shows the winding configuration and currents conducted in interphase reactor 114.

In one implementation of the invention, the kVA rating of the autotransformer 600 in the embodiment of FIG. 12 is 0.18 $P_O(PU)$, the ratings of zero sequence blocking transformers 1202 and 1204 are 0.067 $P_O(PU)$, and the rating of interphase reactor 114 is 0.067 $P_O(PU)$, and the rating of PWM current source 112 is 0.094 $P_O(PU)$. With the active interphase reactor 110" installed, the resulting input current is substantially sinusoidal, providing a clean power utility interface.

From the foregoing detailed description of specific embodiments of the invention, it should be apparent that an active interphase reactor for a twelve-pulse rectifier system has been disclosed. By injecting a low kVA (0.02 $P_o(PU)$) active current source $I_x$ into the interphase reactor, near sinusoidal input currents with less than 1% THD can be obtained. A low kVA twelve-pulse system with the disclosed active interphase reactor can be implemented with autotransformers. The resultant system is a high performance clean power utility interface suitable for powering larger kVA ac motor drives and a wide variety of power electronic systems.

Although specific embodiments of the invention have been described herein in some detail, it is to be understood that this has been done solely for the purposes of illustrating various features and aspects of the invention, and is not intended to be limiting with respect to the scope of the invention. It is contemplated that various substitutions, alterations, and/or modifications, including but not limited to those design alternatives that may have been specifically discussed herein, may be made to the disclosed embodiments without departing from the spirit and scope of the invention as defined in the appended claims, which follow.

What is claimed is:

1. A utility interface for drawing current from a three-phase electric utility, comprising:

a primary transformer, coupled to said three-phase electric utility, for generating first and second three-phase input signals;

first and second rectifiers, coupled to said transformer to receive said first and second three-phase input signals, respectively, for rectifying said first and second three-phase input signals and for producing first and second DC output currents, respectively, between respective positive and negative outputs of said first and second rectifiers;

a first zero sequence blocking transformer having first and second windings each having first and second terminals, said first terminal of said first winding being coupled to said positive output of said first rectifier and said first terminal of said second winding being coupled to said negative output of said first rectifier;

a second zero sequence blocking transformer having first and second windings each having first and second terminals, said first terminal of said first winding being coupled to said positive output of said second rectifier and said first terminal of said second winding being coupled to said negative output of said second rectifier;

said second terminal of said first zero sequence blocking transformer's second winding being coupled to said second terminal of said second zero sequence blocking transformer's second winding;

an interphase reactor having a primary winding coupled between said second terminal of said first zero sequence blocking transformer's first winding and said second terminal of said second zero sequence blocking transformer's first winding, said interphase reactor further having a secondary winding;

an active current source, coupled across said secondary winding of said interphase reactor, for injecting a compensation current into said primary winding of said interphase reactor.

2. A utility interface in accordance with claim 1, wherein said primary transformer has an autotransformer winding configuration such that said first and second three-phase input signals are balanced with plus and minus thirty degrees of phase displacement from said electric utility.

3. A utility interface in accordance with claim 1, wherein said injected compensation current is a substantially triangular waveform.

4. A method of drawing substantially sinusoidal input currents from a three-phase power utility, comprising:

(a) coupling a primary transformer to said power utility to derive first and second three-phase input signals therefrom;

(b) applying said first and second three-phase input signals to first and second rectifiers, respectively, to derive first and second DC currents on first and second bus pairs, respectively, each comprising a positive bus and a negative bus;

(c) coupling said positive bus and negative bus of said first rectifier to first and second terminals of a first zero sequence blocking transformer;

(d) coupling said positive bus and negative bus of said second rectifier to first and second terminals of a second zero sequence blocking transformer;

(e) coupling a primary winding of an interphase reactor between respective third terminals of said first and second zero sequence blocking transformers;

(f) coupling respective fourth terminals of said first and second zero sequence blocking transformers together;

(g) injecting a compensation current across a secondary winding of said interphase reactor.

5. A method in accordance with claim 3, wherein said transformer has a delta-wye winding connected such that said first and second three-phase input signals are balanced with thirty degrees of phase shift therebetween.

6. A method in accordance with claim 4, wherein said injected compensation current is a substantially triangular waveform.

* * * * *